(12) United States Patent
De Bunje et al.

(10) Patent No.: US 7,356,724 B2
(45) Date of Patent: Apr. 8, 2008

(54) TIMEBOX DRIVEN SCHEDULING OF SOFTWARE COMPONENTS IN HARD REAL-TIME SYSTEMS

(75) Inventors: Albertina De Bunje, Hilversum (NL); Simon Tony Dekker, Hilversum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 411 days.

(21) Appl. No.: 10/505,995

(22) PCT Filed: Feb. 7, 2003

(86) PCT No.: PCT/IB03/00522

§ 371 (c)(1),
(2), (4) Date: Aug. 27, 2004

(87) PCT Pub. No.: WO03/075159

PCT Pub. Date: Sep. 12, 2003

(65) Prior Publication Data

US 2005/0107991 A1      May 19, 2005

(30) Foreign Application Priority Data

Mar. 1, 2002   (EP)   ................................. 02075818

(51) Int. Cl.
*G06F 1/14*   (2006.01)
*G06F 9/46*   (2006.01)
(52) U.S. Cl. ..................... 713/502; 718/102
(58) Field of Classification Search ............... 713/502; 718/102
See application file for complete search history.

(56) References Cited

U.S. PATENT DOCUMENTS

| 6,195,701 | B1* | 2/2001 | Kaiserswerth et al. ...... 709/231 |
| 6,937,988 | B1* | 8/2005 | Hemkumar et al. ........ 704/500 |
| 7,031,306 | B2* | 4/2006 | Amaral et al. .............. 370/389 |
| 2006/0059483 | A1* | 3/2006 | De Bunje et al. ........... 718/100 |

FOREIGN PATENT DOCUMENTS

WO      WO9525313      9/1995

* cited by examiner

*Primary Examiner*—Thomas Lee
*Assistant Examiner*—Ji H Bae

(57) ABSTRACT

The present invention relates to a method of determining when a component is schedulable in a hard real time system for processing time dependent streams of data elements. The number of components is larger than the number of available processors for processing said components and each of the components has at least one input and at least one output. The data elements are provided with time stamps and a component is schedulable when time stamped data elements from a predefined time interval of said time dependent stream of time stamped data element is available at all inputs of said component. In a specific embodiment the time stamps are points on an internally defined algorithmic time axis. The invention also relates to a hard real time system for processing time dependent streams of data elements with means for performing the above determining of scheduleability.

8 Claims, 10 Drawing Sheets

TIMEBOX DRIVEN SCHEDULING OF SOFTWARE COMPONENTS IN HARD REAL-TIME SYSTEMS

FIELD OF THE INVENTION

The invention relates to a method of defining scheduleability of components in a real time system for processing time dependent streams of data elements. The invention further relates to a real time system for processing time dependent streams of data elements.

BACKGROUND OF THE INVENTION

In real-time software systems where the number of components is greater than the number of available processors, components compete for processing time and scheduling of components is required reliably and fast. In the present context, any software system in which the time, at which an output is produced, is essential is referred to as a real-time software system. The lag from the input time of a real-time software system to its output time, i.e. the delay, must be sufficiently small for acceptable timeliness. A hard real-time software system has to respond to an externally generated input within a bounded time interval. A software system in the present context is typically constructed from a number of interconnected components and the only interaction between components is through their interfaces, components do not share state information.

In this kind of system a scheduler assigns processing intervals to the components in such a way that the real-time constraints on system level are met. The scheduling of components consists of two phases that are repeated continuously over time. First the set of schedulable components is determined and then, from this set and according to some prioritisation scheme, a subset of components is selected that will actually be executed on the processors. During execution, one component is executed on each processor.

There exist a number of methods to define when components are schedulable in systems of the type described above:

Time driven scheduleability, here a component is schedulable when a certain amount of time has elapsed.

Algorithmic-time-driven, this method is similar to the time driven method, but instead of real-time a virtual time axis is used.

Data driven, here a component is schedulable when a certain amount of input data is available.

Event driven, this method is a specialisation of data driven, the data is either a Boolean variable that becomes true, or a set of Boolean variables for which a certain Boolean expression becomes true.

Demand driven, in this method components are schedulable when the consumer of output data from a specific component demands a certain amount of data.

In stream-based systems, systems where the input is a time dependent stream of data elements, it is especially important that the lag from the input time to output time is small. Further it is important that a component only is scheduled when the data at the input is ready, whereby the processor utilisation is maximised.

WO 9525313 describes an implementation of the synchronization of a plurality of data streams during processing. A schedule criterion is determined by a trigger condition, e.g. in terms of the state of the streaming processes. Such state is then again related to time marks of the streams and the system time. This document does not solve the problem of executing streaming and control of streaming using one processor by performing scheduling of components.

OBJECT AND SUMMARY OF THE INVENTION

It is an object of the invention to provide a method for scheduling, suitable for achieving real time operation of a system.

This is achieved by a method of determining when a component is schedulable in a real time system for processing time dependent streams of data elements, where a number of components is larger than a number of available processors for processing said components, each of said components having at least one input and at least one output. The data elements are provided with time stamps and a component is schedulable when time stamped data elements from a predefined time interval of said time dependent stream of time stamped data element is available at all inputs of said component.

In a specific embodiment the time stamps are points on an internally defined algorithmic time axis.

Thereby the component being schedulable has enough data elements from, possible different, data input streams available to be processed by the component during a time interval to be assigned to the component. Hereby real time operation, such as hard real time of a system is achieved, because the processor utilisation are improved especially if the stream rates are constant or almost constant the processor utilisation is almost 100%. Further improves efficiency, when a component is scheduled, all data elements at the different input streams in the predefined time interval can actually be processed, whereby a component cannot be scheduled and immediately return because of lack of data Furthermore, while processing the data elements, the component will not be preempted by other components. Therefore, the number of task switches per second is minimised, improving efficiency of the processor cache because the number of cache misses decreases. The method also makes component based design easier for hard real-time systems because:

- for a given application instance, it is relatively straight straightforward to compute the processing resources required to achieve hard real-time behaviour. This computation can be implemented in an application-independent tool.
- components can be largely unaware of real-time issues, which ease their design. The complexity for achieving real-time behaviour is concentrated in the scheduler, which is a one-time effort. Components just need to provide the worst-case computation time for processing the data in a time-box.

The present invention can be used in real-time systems such as, video and audio processing systems in the processed (MPEG2, MPEG4) and unprocessed domain. Further real-time system could be image processing, image recognition, industrial automation, pattern recognition and radar and telecommunication.

In another embodiment the predefined time interval of time stamped data elements comprises the time interval of a predefined number of data elements on a predefined input of said component. Thereby the present invention can be used for specific types of components having a preferred number of data elements to be consumed from a certain input connector, for example a fixed number of audio samples. Further this is an advantage when the predefined time interval should contain for example exactly one data element and the data elements do not arrive with exact equal distance.

In a specific embodiment the component is schedulable when data elements from substantially the same predefined time interval of said time dependent stream of time stamped data elements is available at all inputs. This will lead to a system that is easy to implement and it is easier to allocate buffer memory for a component.

In yet another specific embodiment the length of said predefined time interval are substantially the same for each input and wherein the time interval of at least a first input is displaced a predefined value from the time interval of at least a second input. Thereby deadlock can be avoided. In general the displacement is obtained by displacing the output of components, whereby it is obtained that the components can be independent of the other components in a system.

In a specific embodiment the availability of said predefined time interval of said time stamped data elements is determined by defining a begin time and an end time of said predefined time interval and checking when the time until which data has been processed by a preceding component is newer than the end time of said predefined time interval. Thereby it can easily be determined when a predefined time interval is 'full' for a certain connector, the produced until time is larger than the end of the predefined time interval.

The invention further relates to a real time system for processing time dependent streams of data elements, said system comprising a number of components and a number of processors for processing components, said number of components is larger than the number of processors, each of said components having at least one input and at least one output, said system comprises means for defining scheduleability of said components characterised in that said system comprises means for providing the data elements with time stamps and said means for defining scheduleability is adapted for defining a component to be schedulable when data elements from a predefined time interval of said time dependent stream of time stamped data element is available at all inputs of said component.

BRIEF DESCRIPTION OF THE DRAWINGS

In the following preferred embodiments of the invention will be described referring to the figures, wherein.

DESCRIPTION OF PREFERRED EMBODIMENTS

In the following the terms used in time box driven scheduling of software components in hard real-time systems for stream processing are described.

A system is an apparatus performing a certain task where the way in which it performs this task can be influenced by management and control. In a preferred embodiment the certain task will be restricted to a hard real-time processing of streaming data. A component is a self-contained part of the system, performing a sub-task that is 'atomic', i.e. it is considered not to be useful to subdivide the sub-task any further. The motivation for dividing sub-tasks further or not, is based on experience in the application domain of remultiplexers, encoders and alike. A time stamped data element is a representation of data in a stream. It is supposed that streaming data has data contents and time information. This time information is used to order the elements and to relate the data to time. A time-box is a predefined time interval of time stamped data elements.

Within the system according to the present invention, algorithmic time s is used. At the end, the time information generated for the output streams is related to real time again. The conversion from system time to algorithmic time could e.g. be performed by a conventional time filter placed at the system input and system output.

Figure 1:
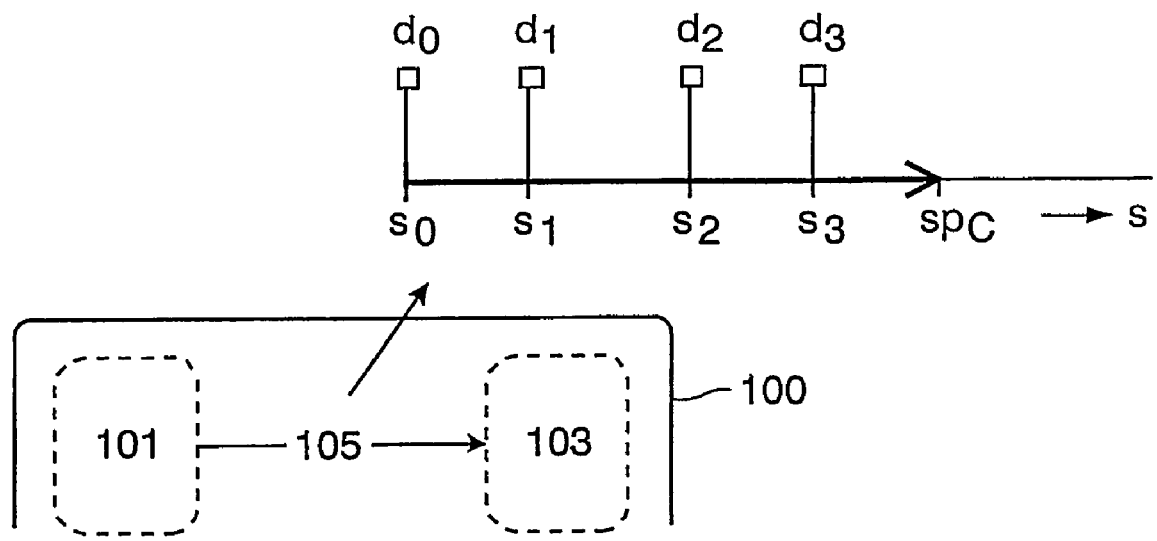
FIG. 1 illustrates a connector between two components.

FIG. 1 illustrates a connector between two components; the connector is a self contained part of the system 100. A source component 101 is connected to a sink component 103, by a connector 105. The dynamic state of a connector 105 consists of a number of elements on the connector 105 comprising the data elements themselves $d_i$ and the produced-until time $sp_C$ (the time until which data has been produced by the source component). Data elements are marked with an algorithmic time $s_i$ and can be appended to a connector because of scheduling of the source component at the source side of the connector. Scheduling the source component also updates the produced-until time for the specific connector. The component at the sink side of the connector can remove data elements when it is scheduled, by processing the data elements. For each component a current time box is defined, the time box has a begin time and an end time. In order to schedule a component the time-box has to be full for all connectors at the input of the component, meaning that all data elements with time stamps $s_i$ in the time interval between the begin time and the end time of the time-box are ready/present or in other words the produced-until time is newer than the end time of the current time box.

Figure 2:
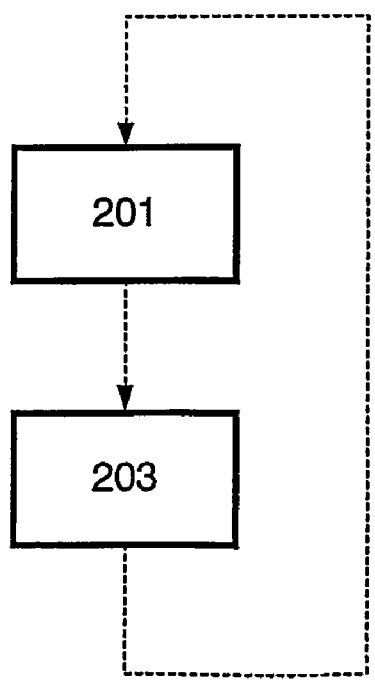
FIG. 2 illustrates in general steps the process of defining scheduleability of components and executing a scheduled component.

FIG. 2 explains in general steps the process of defining scheduleability of components and executing a scheduled component. The process comprises the steps of assigning a time-box to each connector of the component and executing the scheduled component. In 201 a current time-box is assigned to the component, this is done by defining a begin time and an end time of a time interval of the next data elements to be processed by the component. The scheduler could e.g. perform the assigning of a current time-box. When the data elements on a specific connector are ready, meaning that the data elements have been processed by the source component, the data within the current time-box are ready. The current time-box has to be full for each input connector of a component, in order for a component to be scheduleable. In 203 the component has been scheduled, when scheduled the data elements at all connectors, which lies within the bounds of the current time-box, are consumed and processed by the component. The processed data elements are now ready at the output of the component and the produced-until time $sp_c$ for each output connector is updated. In 201 a new current time-box is assigned to the component, this is done by defining a new begin time equalling the end time of the previous time-box for the component.

Figure 3:
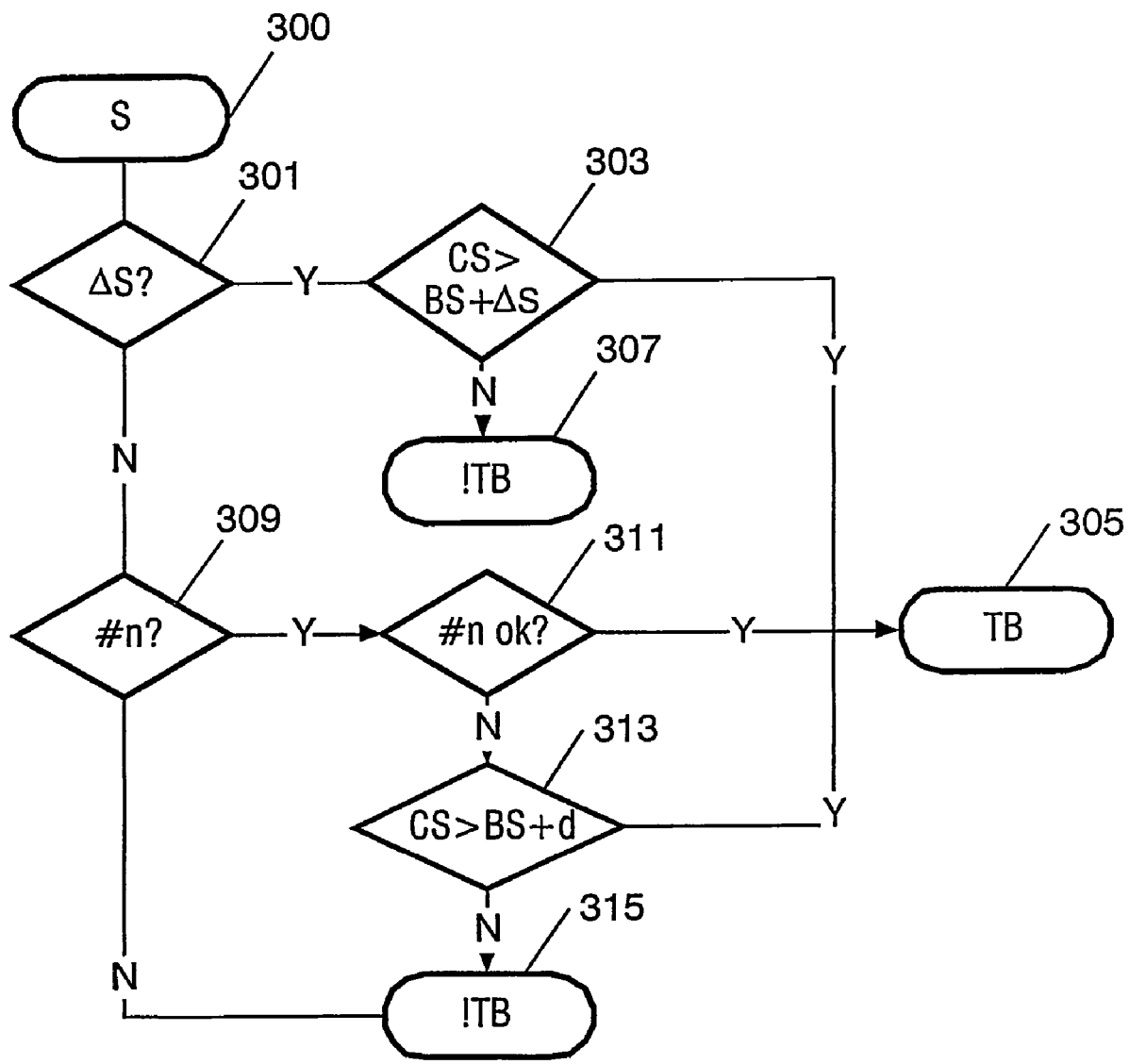
FIG. 3 is a flow diagram illustrating how it is decided whether it is possible to assign a current time box for a specific component.

FIG. 3 is a flow diagram illustrating how it is decided whether it is possible to assign a current time box for a specific component. The decision can be made according to two scenarios depending on the type of component. The first type is a Δs component and the second type is #n component. If the component is a Δs component 301 then it is checked 303 whether the current algorithmic time CS is larger than the begin time BS of the current time box added a predefined time interval Δs being the length of a time box. The begin time of the current time box equals the end time of the previous time box. If this is true then the time box can be defined and assigned the component 305, if false no time-box !TB can be defined and assigned 307 as sufficient time have not yet passed since the component last processed data elements in a time-box. When the component is a #n component 309 then it is first checked 311 whether there is a predefined number of data elements available on a specific connector #n connector, if this is true then the time box TB can be defined 305 where the begin time is the end time of the previous time-box and the end time is the time stamp of the newest data element available at the specific connector. If it is not true it is checked 313 whether the current algorithmic time is larger than a begin time of a current time box added a displacement value d. If this is true then the data elements are ready and the time box can be defined 305, if false no time-box !TB can be defined as sufficient data elements is not present yet at the n'th connector. In general words Δs components will be able to deal with slightly varying amount of data in their current time-box, while #n-components will take the same amount of data from the input that is specified as the #n connector.

Figure 4:
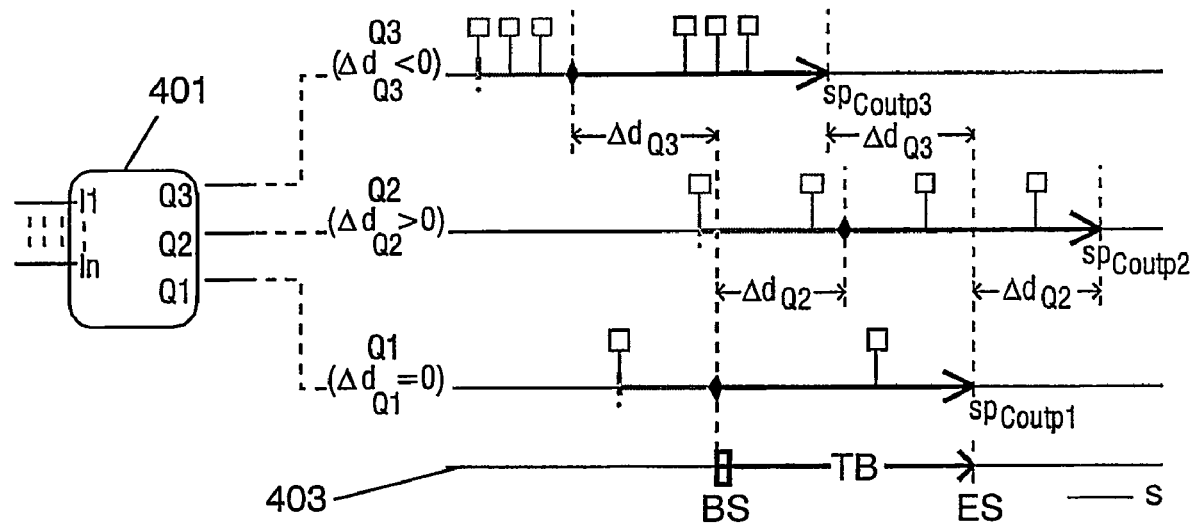
FIG. 4 illustrates displacement of the current time box for each connector.

In an embodiment the current time box assigned a component might be displaced in time for each connector as illustrated in FIG. 4. In 401 a component is illustrated having a number of inputs (I1 . . . In) and three outputs (Q1, Q2, Q3). A time-box TB is assigned to the component having begin time BS and end time ES as shown by 403. In this example output Q1 has no displacement; Q2 has a positive displacement and Q3 a negative one. The produced-until time for a certain output connector is linked directly to the end-time of the time box by adding the output's displacement:

$$sp_{cQ} = ES(TB) + \Delta dQ$$

where CQ is the connector attached to output Q of the component, $sp_{CQ}$ produced-until time of connector CQ, se(TB) end time of time box TB with which the component 401 was scheduled and ΔdQ is the displacement of output Q of the component.

Figure 5:
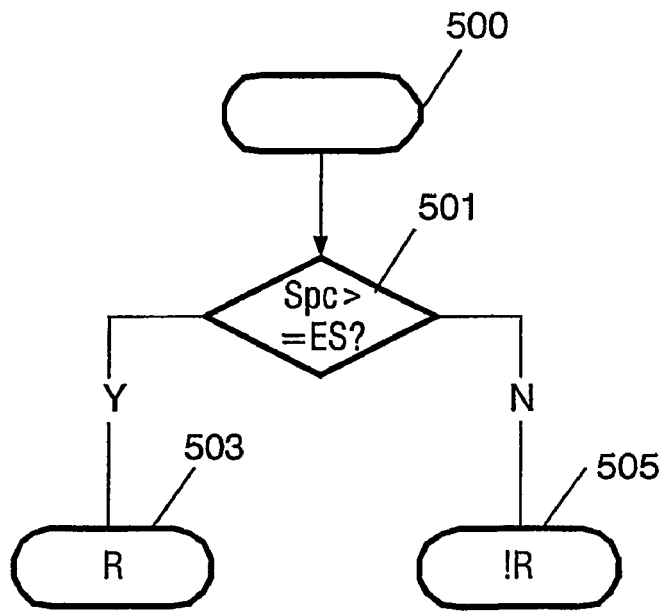
FIG. 5 illustrates how the scheduler uses the time-boxes when determining scheduleability of components.

Using FIG. 5 it is described how the scheduler uses the time-boxes when determining scheduleability of components. The scheduleability is determined by checking each input connector of the component and if the produced until time $sp_c$ for the connector is equal or larger than the end time ES of the time-box of the component then this connector makes the component qualified to be scheduled 503, otherwise the component is not ready to be scheduled 505. As mentioned earlier each input connector of a component has to qualify in order to qualify the component to be scheduled.

In FIG. 6-11 an example where time-box driven scheduling is used in connection with a remultiplexer is illustrated. The remultiplexer comprises the following 7 components two RtTsin components (Real Time Transaction) adapted for receiving the transport streams All Sky Inager (ASI), two Program Identifiers (PID)-mappers to replace the PID's of the streams, one multiplexer RtMux (Real Time Multiplexer) to combine the two streams into one stream, one output component RtTsOut (Real Time Transaction) for outputting the combined stream and one fork RtFork (Real Time Fork) to duplicate the Input/Output (I/O) Event in order to force that the multiplexer and the output to run at the same speed. The remultiplexer further comprises three event generators EVG to rule the input and output of data and provide time stamps. The boxes illustrated at the connections are time-boxes, where a filled box illustrates a filled time box. In the figures a schedulable component is marked with a punctured lined box surrounding the component and a component that has just been scheduled is marked with a lined box. In the FIGS. 7-11 different states of the remultiplexer is shown and how the scheduleability is defined is explained, the present description is not concerned with the scheduling and the priority scheme used when scheduling, since the present invention is only concerned with the definition of scheduleability of components.

Figure 6:
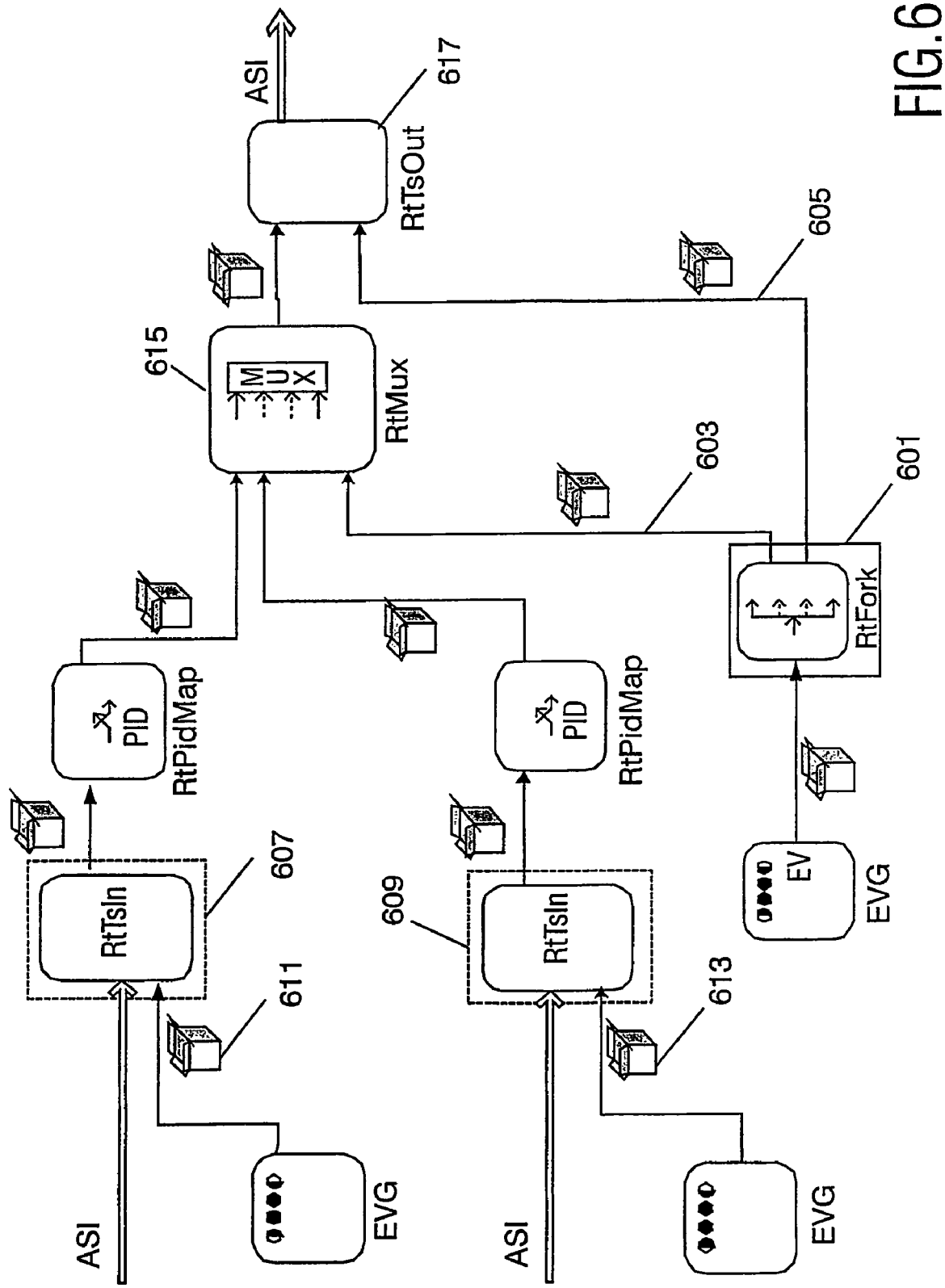
FIG. 6-11 illustrate an example where time-box driven scheduling is used in connection with a remultiplexer.

In FIG. 6 the fork 601 has just been scheduled and at the connection 603 between the fork 601 and multiplexer 616 and the connection 606 between the fork 601 and the output component 617 a full time box is present, but neither the multiplexer 616 or the output component 617 is schedulable since not all inputs of these components have full timeboxes. The only schedulabe components in this state is the input components 607, 609 since all the input of these components has a full time-box 611, 613.

Figure 7:
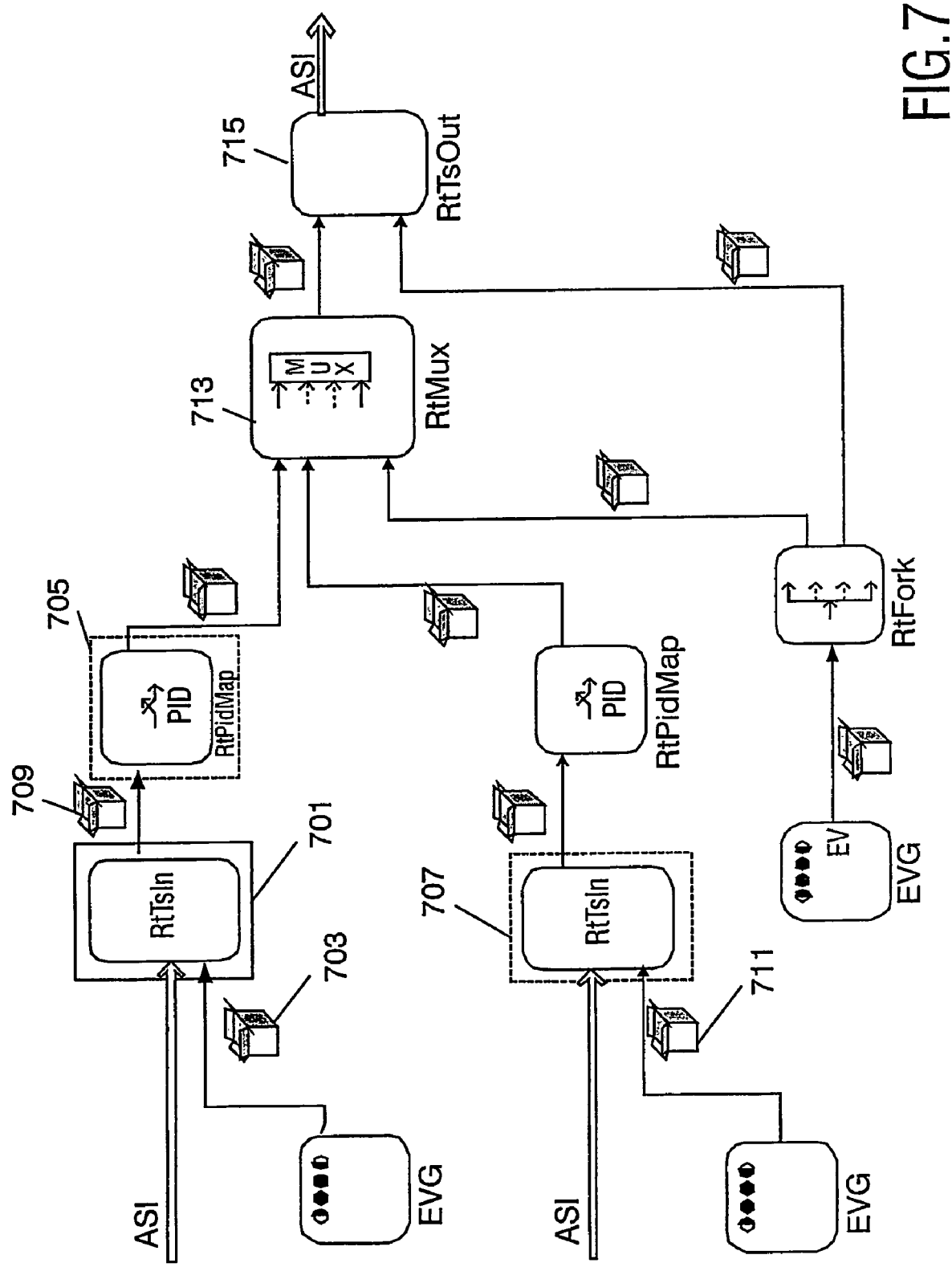

In FIG. 7 the scheduler has selected one of the input components 701 to be executed and this component has been executed, whereby the time-box 703 at the input has been emptied and the time-box 709 at the output has been filled. In this state it is only the PID mapper 705 and the other input component 707 that can be scheduled since they are the only components with full time-boxes 709, 711 at all their inputs. Both the multiplexer 713 and the output component 715 are not schedulable since all inputs of these components do not have full time-boxes.

Figure 8:
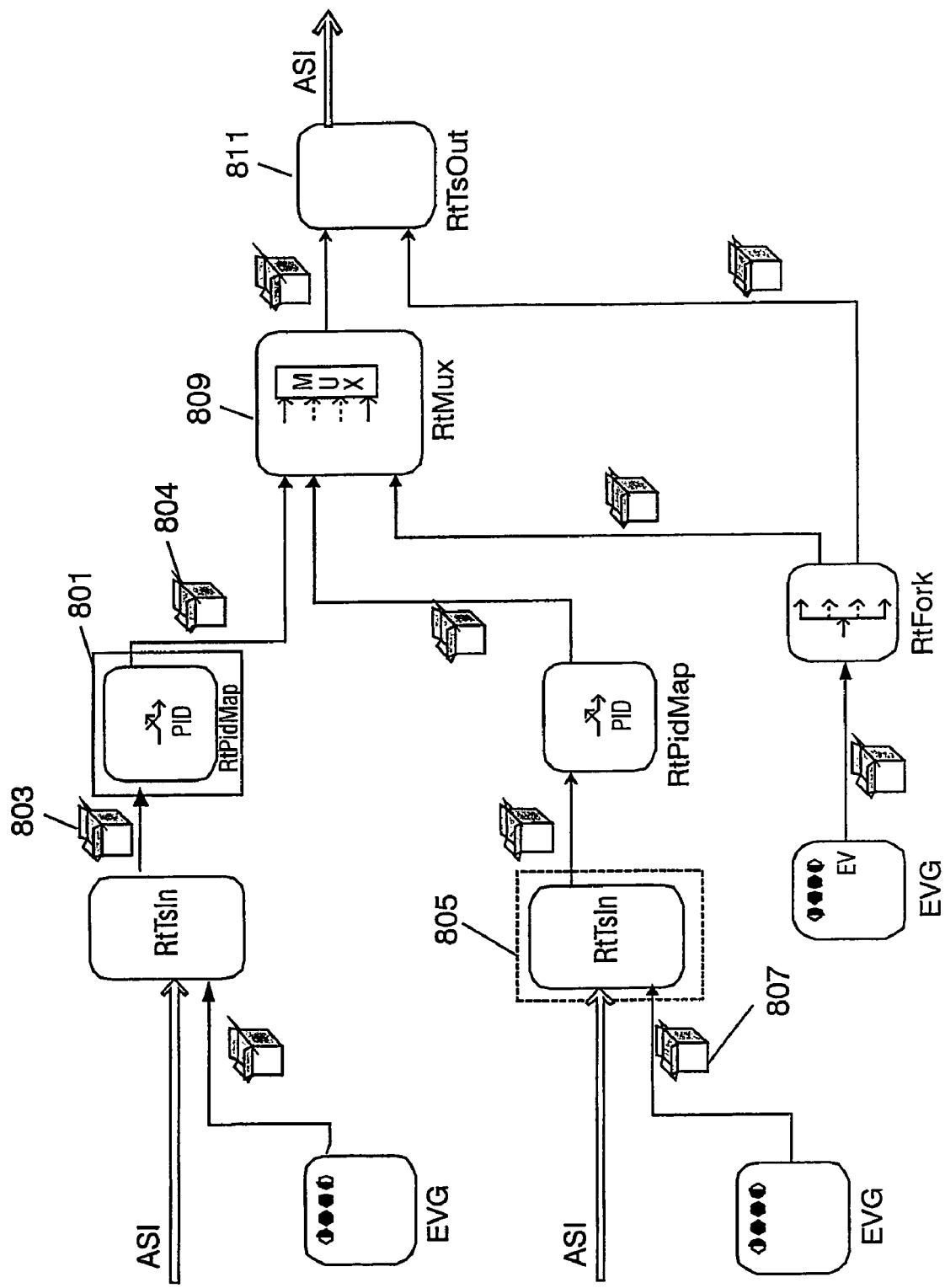

In FIG. 8 the scheduler has selected the PID mapper 801 component to be executed and this component has been executed, whereby the time-box 803 at the input has been emptied and the time-box 804 at the output has been filled. In this state it is only the input component 805 that can be scheduled since it is the only component with a full time-box 807 at all its inputs. Both the multiplexer 809 and the output component 811 are still not schedulable since all inputs of these components do not have full time-boxes.

Figure 9:
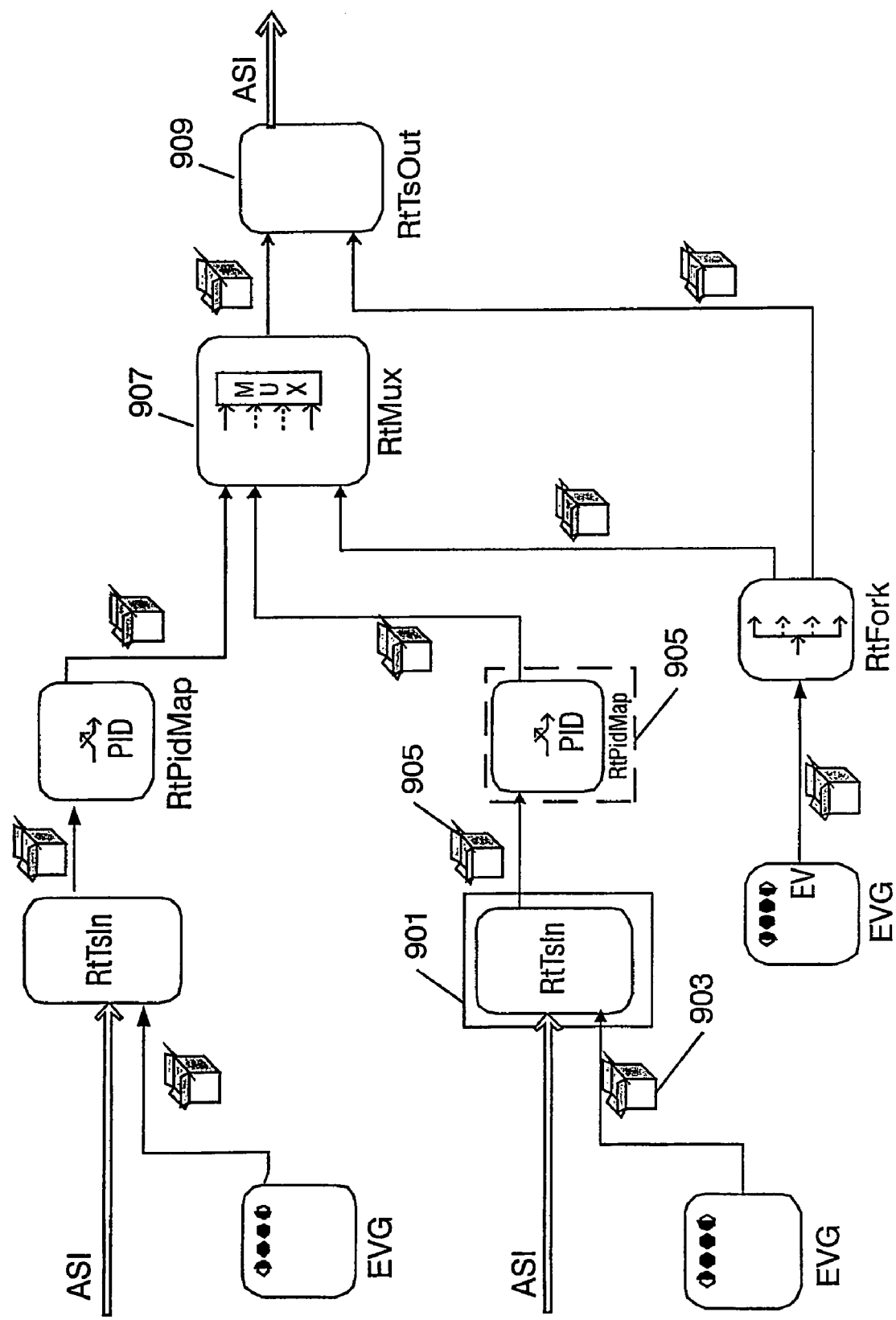

In FIG. 9 the scheduler has selected the input component 901 to be executed and this component has been executed, whereby the time-box 903 at the input has been emptied and the time-box 905 at the output has been filled. In this state it is only the PID mapper 905 that can be scheduled since it is the only component with full time-boxes at all its inputs. Both the multiplexer 907 and the output component 909 is still not schedulable since all inputs of these components does not have full time-boxes.

Figure 10:
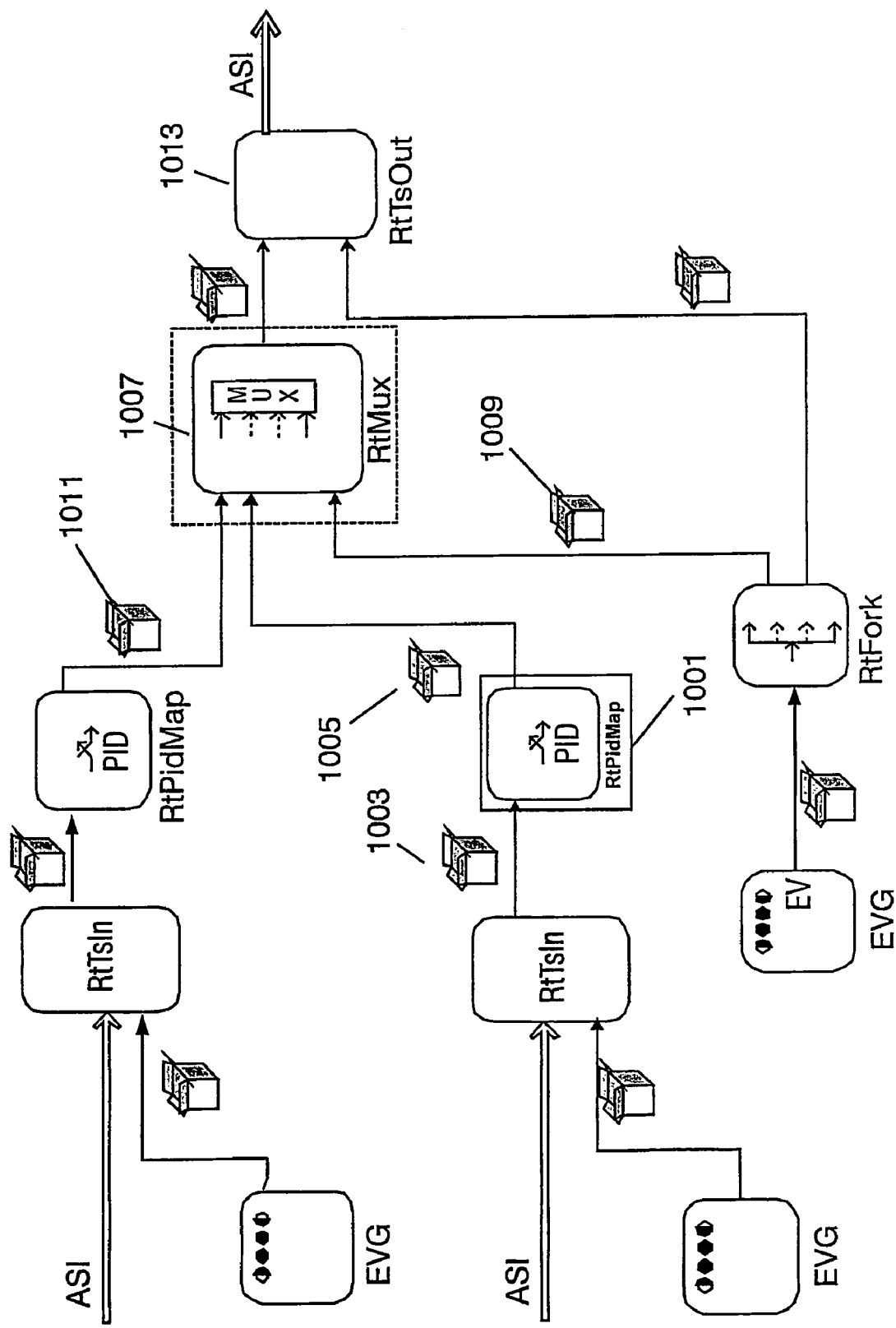

In FIG. 10 the scheduler has selected the PID mapper 1001 component to be executed and this component has been executed, whereby the time-box 1003 at the input has been emptied and the time-box 1005 at the output has been filled. The multiplexer 1007 can now be scheduled since all time-boxes 1005, 1009, 1011 at the input are full, but the output component 1013 is still not schedulable since all inputs does not have full time-boxes.

Figure 11:
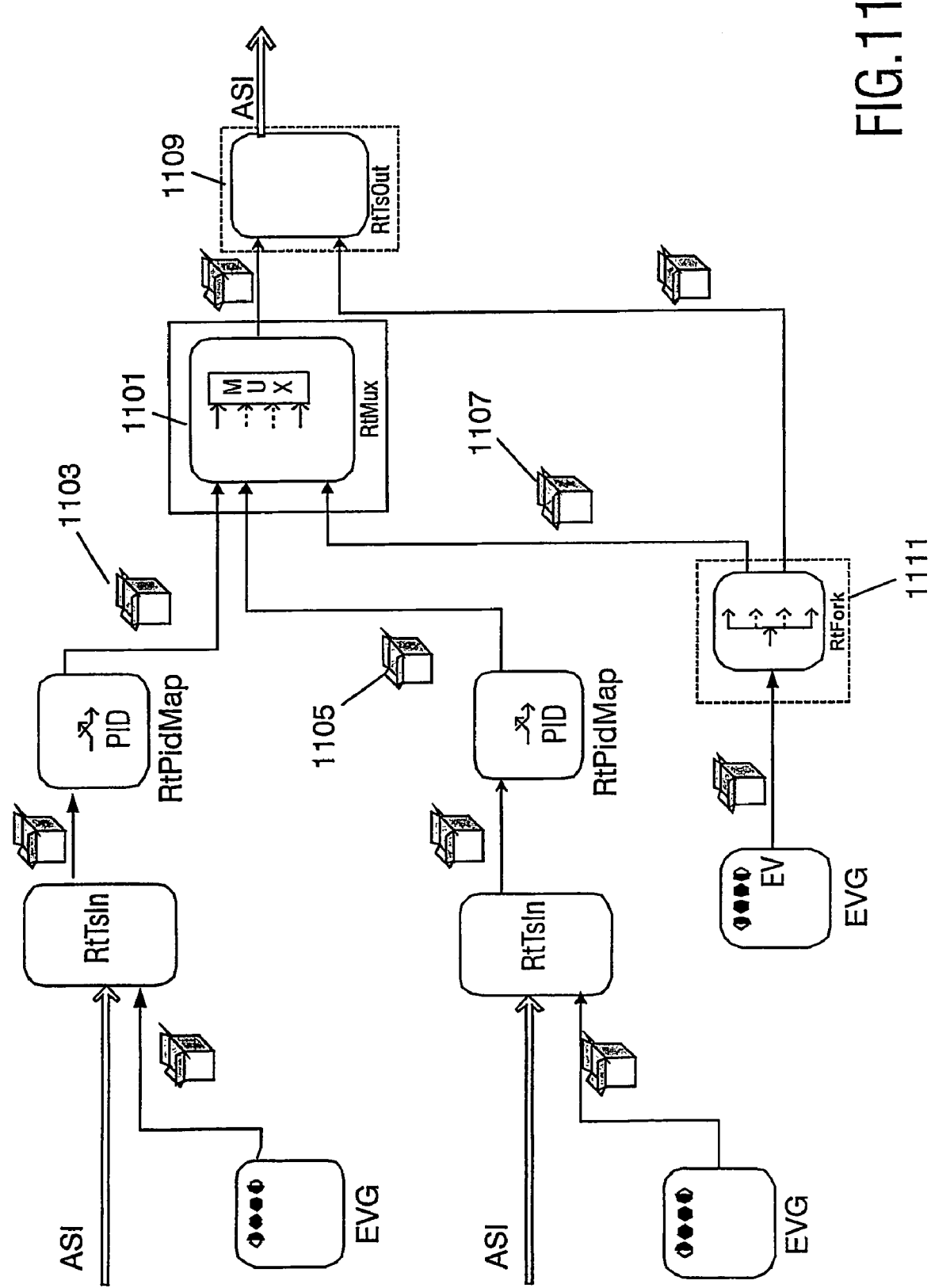

In FIG. 11 the scheduler has selected the multiplexer component 1101 to be executed and this component has been executed, whereby the time-boxes 1103, 1105, 1107 at the input has been emptied. In this state only the output component 1109 and the fork 1111 can be scheduled since they are the only components with full time-boxes at all the component inputs.

Figure 12:
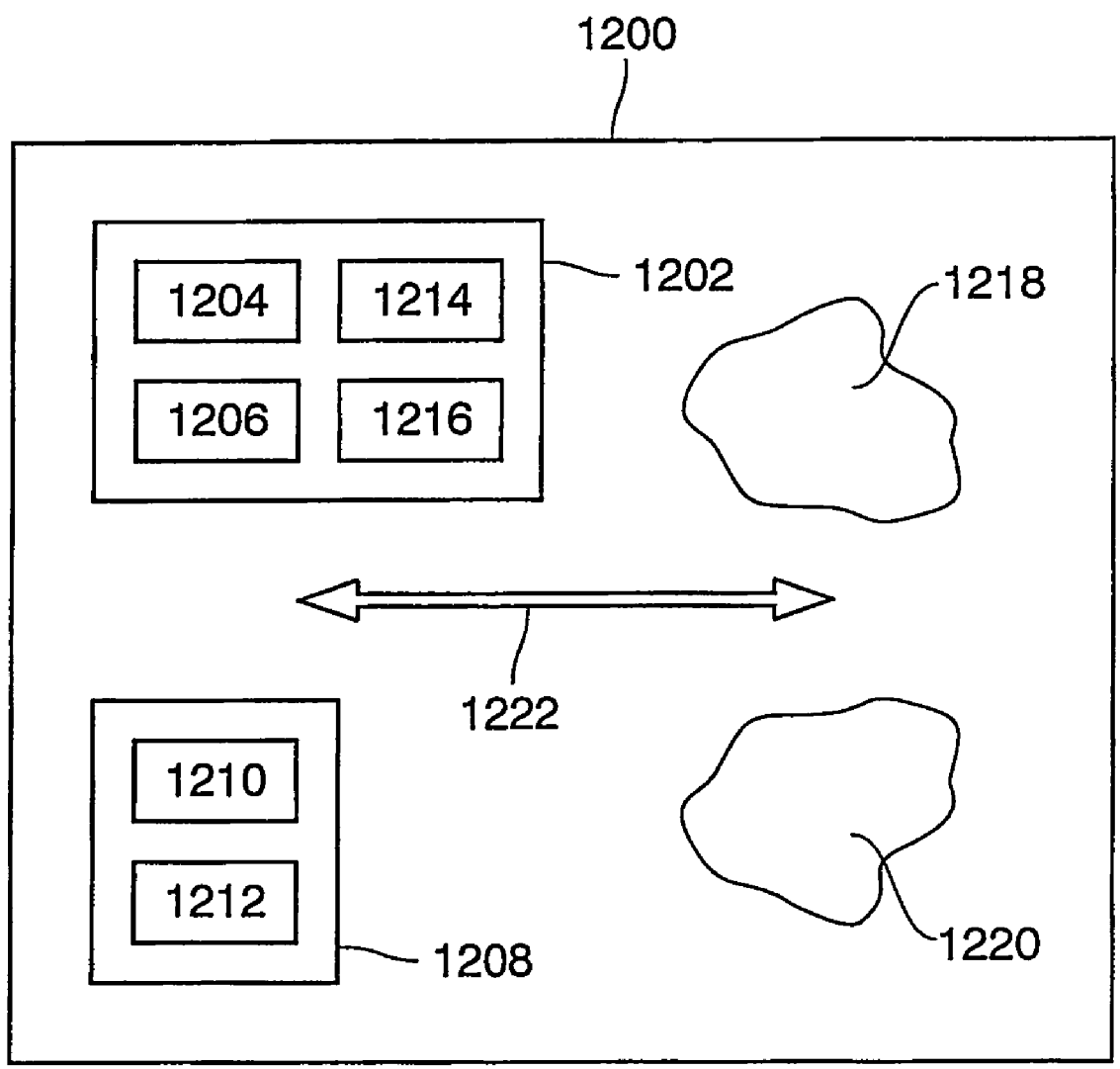
FIG. 12 illustrates an embodiment of the system according to the invention.

FIG. 12 illustrates a system 1200 according to the invention. Here, the system comprises two memories 1202 and 1208, two processors 1218, 1220 and a software bus 1222 that enables communication of data between the two memories 1202, 1208 and the processors 1218, 1220. Memory 1202 comprises a component 1204 written in software, for example an RtTsin component as previously described. Furthermore memory 1202 comprises components 1206, 1214 and 1216 written in software, for example a RtPidMap, a RtFork and a RtMux as previously described. Memory 1208 comprises two software modules 1210 and 1212. Module 1210 can be referred to as the scheduler that determines scheduleability of the components 1204, 1206, 1214 and 1216. Module 1212 is designed to provide time stamps to data elements as previously described.

The invention claimed is:

1. A method of determining when a component is schedulable in a real time system for processing time dependent streams of data elements, where a number of components is larger than a number of available processors for processing said components, each of said components having at least one input and at least one output, characterised in that the data elements are provided with time stamps and a component is schedulable when data elements having time stamps equal to or greater than an end time of a predefined time interval are available at the inputs of said component.

2. A method according to claim 1, wherein the time stamps are points on an internally defined algorithmic time axis.

3. A method according to claim 1, wherein said predefined time interval of time stamped data elements comprises the time interval of a predefined number of data elements on a predefined input of said component.

4. A method according to claim 1, wherein said component is schedulable when data elements from substantially the same predefined time interval of said time dependent stream of time stamped data elements is available at all inputs.

5. A method according to claim 1, wherein a length of said predefined time interval is substantially the same for each input and wherein the time interval of at least a first input is displaced a predefined value from the time interval of at least a second input.

6. A method according to claim 1, wherein an availability of said predefined time interval of said time stamped data elements is determined by defining a begin time and an end time of said predefined time interval and checking when the time until which data has been processed by a preceding component is newer than the end time of said predefined time interval.

7. A method according to claim 1, wherein the time dependent streams of time stamped data elements is a stream of multimedia data.

8. A real time system (1200) for processing time dependent streams of data elements, said system (1200) comprising a number of components (1204, 1206, 1214, 1216) and a number of processors (1218, 1220) for processing components, said number of components is larger than the number of processors, each of said components having at least one input and at least one output, said system (1200) comprises means (1210) for defining scheduleability of said components characterised in that said system (1200) comprises means (1212) for providing the data elements with time stamps and said means (1210) for defining scheduleability is adapted for defining a component to be schedulable when data elements having time stamps equal to or greater than an end time of a predefined time interval are available at the inputs of said component.

* * * * *